US011827562B2

(12) United States Patent
Fan et al.

(10) Patent No.: US 11,827,562 B2
(45) Date of Patent: Nov. 28, 2023

(54) BONDABLE GLASS AND LOW AUTO-FLUORESCENCE ARTICLE AND METHOD OF MAKING IT

(71) Applicant: SCHOTT GLASS TECHNOLOGIES (SUZHOU) CO. LTD., Jiangsu (CN)

(72) Inventors: Huiyan Fan, Jiangsu (CN); Junming Xue, Shanghai (CN); Pengxiang Qian, Shanghai (CN); Matthias Jotz, Mainz (DE); Fredrik Prince, Mainz (DE)

(73) Assignee: SCHOTT GLASS TECHNOLOGIES (SUZHOU) CO. LTD, Jiangsu (CN)

(*) Notice: Subject to any disclaimer, the term of this patent is extended or adjusted under 35 U.S.C. 154(b) by 381 days.

(21) Appl. No.: 16/906,826

(22) Filed: Jun. 19, 2020

(65) Prior Publication Data

US 2020/0317559 A1 Oct. 8, 2020

Related U.S. Application Data

(63) Continuation of application No. PCT/CN2017/117670, filed on Dec. 21, 2017.

(51) Int. Cl.
*C03C 3/118* (2006.01)
*C03B 17/06* (2006.01)
(Continued)

(52) U.S. Cl.
CPC ............ *C03C 3/118* (2013.01); *C03B 17/064* (2013.01); *C03C 3/091* (2013.01); *C03C 3/093* (2013.01);
(Continued)

(58) Field of Classification Search
CPC ........... H01L 21/7624; H01L 21/76297; C03C 3/118; C03C 3/091; C03C 3/093;
(Continued)

(56) References Cited

U.S. PATENT DOCUMENTS 5,277,946 A 1/1994 Nagai et al.
6,355,577 B1 * 3/2002 Reder ................. C23C 16/4581
438/758
(Continued)

FOREIGN PATENT DOCUMENTS

CN 101723584 6/2010
CN 102050570 5/2011
(Continued)

OTHER PUBLICATIONS

Okada, "Effect of Glass materials on Joints in Anodic Bonding of Glass to Silicon", The Journal of the Japan Institute of Metals and Materials, JP, The Japan Institute of Metals and Materials, Feb. 1, 2009, vol. 73, No. 2, pp. 110 to 115 with partial English translation.
(Continued)

*Primary Examiner* — Frank J Vineis
*Assistant Examiner* — Laura B Figg
(74) *Attorney, Agent, or Firm* — Ruggiero McAllister & McMahon LLC

(57) ABSTRACT

The present disclosure relates to glass articles, a method of making the glass articles, and uses of the glass articles. The glass article has a UV-transmittance of more than 90% at 350 nm and at 500 nm and a total amount of $Si_2$, $B_2O_3$ and $Al_2O_3$ of at least 75 mol %. The article is preferably used in the fields of biotechnology, MEMS, CIS, MEMS-like pressure sensor, display, micro array, electronic devices, microfluidics, semiconductor, high precision equipment, camera imaging, display technologies, sensor/semicon, electronic devices, home appliance, diagnostic product, and/or medical device.

14 Claims, 2 Drawing Sheets

(51) Int. Cl.
*C03C 3/091* (2006.01)
*C03C 3/093* (2006.01)
*C03C 4/00* (2006.01)
*C03C 4/18* (2006.01)
*C03C 21/00* (2006.01)

(52) U.S. Cl.
CPC .............. *C03C 4/0085* (2013.01); *C03C 4/18* (2013.01); *C03C 21/002* (2013.01); *C03C 2204/00* (2013.01)

(58) Field of Classification Search
CPC ....... C03C 4/0085; C03C 4/18; C03C 21/002; C03C 2204/00; C03B 17/064
See application file for complete search history.

(56) References Cited

U.S. PATENT DOCUMENTS

| | | | |
|---|---|---|---|
| 2003/0188553 | A1 | 10/2003 | Mann |
| 2007/0111471 | A1 | 5/2007 | Okada |
| 2010/0126221 | A1 | 5/2010 | Danielson |
| 2010/0213582 | A9* | 8/2010 | Couillard ......... H01L 21/76254 148/33.3 |
| 2013/0004758 | A1 | 1/2013 | Dejneka |
| 2014/0235031 | A1* | 8/2014 | Herbots ............. H01L 21/187 438/455 |
| 2015/0314571 | A1 | 11/2015 | Sorensen, Jr. et al. |
| 2015/0368147 | A1 | 12/2015 | Dejneka |
| 2020/0024187 | A1 | 1/2020 | Gong et al. |

FOREIGN PATENT DOCUMENTS

| | | |
|---|---|---|
| CN | 106800370 | 6/2017 |
| CN | 106865982 | 6/2017 |
| EP | 2646243 | 10/2013 |
| JP | 2004053559 | 2/2004 |
| JP | 2005522400 | 7/2005 |
| JP | 2010159203 | 7/2010 |
| JP | 2014522798 | 9/2014 |
| JP | 2016504985 | 2/2016 |
| JP | 2017119625 | 7/2017 |
| JP | 2017218353 | 12/2017 |
| WO | 0129890 | 4/2001 |
| WO | 0234684 | 5/2002 |
| WO | 2014/139552 | 9/2014 |
| WO | 2016115685 | 7/2016 |
| WO | WO-2016115685 A1 * | 7/2016 ............. C03C 3/091 |
| WO | 2017139552 | 8/2017 |

OTHER PUBLICATIONS

Suzuki, "Lecture on vacuum technology, For extreme high vacuum experiments (9), Material [II]", Journal of the Vacuum Society of Japan, JP, the Vacuum Society of Japan, Jul. 1988, 31, 7, pp. 704 to 712 (document showing common technical knowledge) with partial English translation.

Schott Tempax Float®—borosilicate glass 3.3 <TENPAX Float>, JP, Schott Japan K.K., Feb. 1, 2005, pp. 1 to 16 (document showing common technical knowledge).

* cited by examiner

BONDABLE GLASS AND LOW AUTO-FLUORESCENCE ARTICLE AND METHOD OF MAKING IT

CROSS-REFERENCE TO RELATED APPLICATIONS

The present application is a continuation of International Patent Application Number PCT/CN2017/117670, filed on Dec. 21, 2017, which is incorporated herein by reference.

BACKGROUND OF THE DISCLOSURE

1. Field of the Disclosure

The present disclosure relates to glass articles, a method of making the glass articles, and uses of the glass articles. In particular, the present disclosure relates to a UV-transmittance of more than 90% at 350 nm and at 500 nm, a total amount of $SiO_2$, $B_2O_3$ and $Al_2O_3$ of at least 75 mol %.

2. DISCUSSION OF THE RELATED ART

U.S. Pat. No. 5,277,946 A has glass articles of ≤0.7 mm thickness for use together with a semiconductor. WO 01/29890 A2 concerns a method of anodic bonding, and the use of respective products for making biological circuitry (microfluidics). WO 02/34684 A1 relates to anodic bonding of glass to silicon, or metal at low temperatures. The technology is based on the use of phosphate glasses for the glass wafer. The glasses also contain very high amounts of alkali metal oxides, which leads to impaired hydrolytical resistance. US 2007/0111471 A1 discloses anodic bonding technologies at reduced temperatures to avoid warp. The technologies include energy wave surface activation of the wafers to be bonded, such as an atom beam, an ion beam, or a plasma.

Generally, bonding temperatures, voltage, and duration should be as low as possible, whereas bonding strength should be high. At the same time, the process steps for bonding articles such as wafers should be as simple as possible. Further, for biological applications it would be useful to have glass articles that show no, or very low auto-fluorescence. Still further, materials for making the articles should not contain excessively expensive constituents like tantalum, or niobium oxides. Also, it is desirable that materials have good hydrolytical resistances in acidic and basic conditions. The materials should be obtainable using economical standard processes.

SUMMARY OF THE DISCLOSURE

The present disclosure provides solutions to one or more of the above-mentioned problems.

In an embodiment, the present disclosure provides a glass article, having a UV-transmittance of more than 90% at 350 nm and at 500 nm, in particular when measured at a thickness of 0.5 mm, a total amount of $SiO_2$, $B_2O_3$ and $Al_2O_3$ of at least 75 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\dfrac{x_{Si4+}}{x_{B3+} + x_{Al3+}} \geq 2.0$, and $\dfrac{x_{Si4+}}{x_{B3+} + x_{Al3+}} \leq 8.0$;

ii. $\dfrac{x_{B3+}}{x_{Al3+}} \geq 0.5$ wherein the proportion of $Li_2O$ is less than 0.01 mol %.

In an embodiment, the present disclosure provides a glass article, having a UV-transmittance of more than 90% at 350 nm and at 500 nm, in particular when measured at a thickness of 0.5 mm, a total amount of $SiO_2$, $B_2O_3$ and $Al_2O_3$ of at least 90 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\dfrac{x_{Si4+}}{x_{B3+} + x_{Al3+}} \geq 3.0$, and $\dfrac{x_{Si4+}}{x_{B3+} + x_{Al3+}} \leq 4.0$;

ii. $\dfrac{x_{B3+}}{x_{Al3+}} \geq 1.5$ wherein the proportion of $Li_2O$ is less than 0.01 mol %.

Network formers like boron and aluminum are included in the glass to improve UV transmittance. This may be due to the increase of non-bridging oxygen induced by the network modifiers like alkali or alkaline earth cations. Also, these glasses have good chemical and hydrolytical resistance.

In an embodiment, the present disclosure provides a glass article with $Li^+$-activatable bonding properties, having a UV-transmittance of more than 90% at 350 nm and at 500 nm, in particular when measured at a thickness of 0.5 mm, a total amount of $Si_2$, $B_2O_3$ and $Al_2O_3$ of at least 75 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\dfrac{x_{Si4+}}{x_{B3+} + x_{Al3+}} \geq 2.0$, and $\dfrac{x_{Si4+}}{x_{B3+} + x_{Al3+}} \leq 8.0$;

ii. $\dfrac{x_{B3+}}{x_{Al3+}} \geq 0.5$ wherein the proportion of $Li_2O$ is less than 0.01 mol %, and wherein the glass article has a Lithium Activatable Bonding Strength to Silicon (LABS) of at least 1.1 MPa.

In an embodiment, the present disclosure provides a glass article with $Li^+$-activatable bonding properties, having a UV-transmittance of more than 90% at 350 nm and at 500 nm, in particular when measured at a thickness of 0.5 mm, a total amount of $SiO_2$, $B_2O_3$ and $Al_2O_3$ of at least 90 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\dfrac{x_{Si4+}}{x_{B3+} + x_{Al3+}} \geq 3.0$, and $\dfrac{x_{Si4+}}{x_{B3+} + x_{Al3+}} \leq 8.0$;

ii. $\dfrac{x_{B3+}}{x_{Al3+}} \geq 0.5$ wherein the proportion of $Li_2O$ is less than 0.01 mol %, and wherein the glass article has a Lithium Activatable Bonding Strength to Silicon (LABS) of at least 1.1 MPa.

In an embodiment, the present disclosure provides a glass article with $Li^+$-activatable bonding properties, having a UV-transmittance of more than 90% at 350 nm and at 500 nm, in particular when measured at a thickness of 0.5 mm, a total amount of $SiO_2$, $B_2O_3$ and $Al_2O_3$ of at least 90 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\frac{x_{Si4+}}{x_{B3+}+x_{Al3+}} \geq 3.0$, and $\frac{x_{Si4+}}{x_{B3+}+x_{Al3+}} \leq 8.0$;

ii. $\frac{x_{B3+}}{x_{Al3+}} \geq 1.5$ wherein the proportion of $Li_2O$ is less than 0.01 mol %, and wherein the glass article has a Lithium Activatable Bonding Strength to Silicon (LABS) of at least 1.1 MPa.

The glass article is $Li^+$-activatable for bonding with a semiconductor so that after activation with lithium, bonding such as anodic bonding may be done at lower temperatures and/or for a shorter period of time than would have been the case without lithium activation. In other words, the property of being $Li^+$-activatable refers to the article's ability to acquire improved bonding properties by lithium enrichment of its surface. Lithium activation includes enriching at least one surface layer of the glass article with $Li^+$ ions. The extent of lithium enrichment in a given time is influenced by the fictive temperature of the glass, which is influenced by cooling and/or annealing conditions during production. A glass with a higher fictive temperature will be more susceptible to lithium activation. After lithium activation, bonding may take place in milder conditions than before. Harsh bonding conditions might destroy circuits on a wafer, such as those for CMOS.

In an embodiment, the present disclosure provides a glass article with $Li^+$-activatable bonding properties, having a UV-transmittance of more than 90% at 350 nm and at 500 nm, in particular when measured at a thickness of 0.5 mm, a total amount of $Si_2$, $B_2O_3$ and $Al_2O_3$ of at least 75 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\frac{x_{Si4+}}{x_{B3+}+x_{Al3+}} \geq 2.0$, and $\frac{x_{Si4+}}{x_{B3+}+x_{Al3+}} \leq 8.0$;

ii. $\frac{x_{B3+}}{x_{Al3+}} \geq 0.5$ wherein the proportion of $Li_2O$ is less than 0.01 mol %, and wherein the glass article has a susceptibility to lithium activation characterized in that the lithium activated article exhibits a bonding strength to silicon which is increased by a factor of at least 2 when compared to an article that has not undergone lithium activation. The lithium activation comprises immersing the glass article in a mixture of $LiNO_3$/$NaNO_3$ containing 200 ppm of $Li^+$ at a temperature of 300° C. for 60 minutes.

In an embodiment, the present disclosure provides a glass article with $Li^+$-activatable bonding properties, having a UV-transmittance of more than 90% at 350 nm and at 500 nm, in particular when measured at a thickness of 0.5 mm, a total amount of $Si_2$, $B_2O_3$ and $Al_2O_3$ of at least 90 mol %, wherein a molar proportion $x_{Si4+}$ of $Si^{4+}$, a molar proportion $x_{B3+}$ of $B^{3+}$ and a molar proportion $x_{Al3+}$ of $Al^{3+}$ are present in accordance with the following ratios i. $\frac{x_{Si4+}}{x_{B3+}+x_{Al3+}} \geq 3.0$, and $\frac{x_{Si4+}}{x_{B3+}+x_{Al3+}} \leq 8.0$;

ii. $\frac{x_{B3+}}{x_{Al3+}} \geq 1.5$;

wherein the proportion of $Li_2O$ is less than 0.01 mol %, and wherein the glass article has a susceptibility to lithium activation characterized in that the lithium activated article exhibits a bonding strength to silicon which is increased by a factor of at least 2 when compared to an article that has not undergone lithium activation, wherein lithium activation comprises immersing the glass article in a mixture of $LiNO_3$/$NaNO_3$ containing 200 ppm of $Li^+$ at a temperature of 300° C. for 60 minutes.

An article that has a high susceptibility to lithium activation has the advantage that even small depths of lithium enriched layers in the article provide for the beneficial effects of the activation. This allows for even milder bonding conditions, and shorter activation treatment times. However, the glass articles of this disclosure show good direct bondability without lithium activation as well.

Definitions

Lithium Activatable Bonding Strength to Silicon (LABS) is indicative of how susceptible an article is to lithium activation. LABS is the bonding strength in MPa of a glass article when bonded to a silicon wafer after immersing the glass article in a mixture of $LiNO_3$/$NaNO_3$ containing 200 ppm of $Li^+$ at a temperature of 300° C. for 60 minutes. The bonding strength is determined with a bonding strength test setup as shown in FIG. 1. Bonding strength is tested after anodic bonding at a bonding temperature of 250° C., a bonding voltage of 360 V, bonding pressure of 0.2 MPa in vacuum of 0.001 Pa. The bonding set up is shown in FIG. 2. For the bonding strength test, the bonded glass/silicon pairs are cut into pieces with sizes of 20 mm×20 mm. Aluminum alloy holders are attached to both sides of the bonded pair using epoxy resin. Any other resin that does not fail under the test conditions may be used. The samples are tested on a mechanical strength tester. Tensile force is increased until the glass article breaks, and the value of maximum force is recorded. Bonding strength is the tensile force per sample surface area, yielding the LABS value.

Bonding strength is the ability of an article to remain in contact with another article while withstanding a tensile force. The bonding strength is determined with a bonding strength test setup as shown in FIG. 1. For the bonding strength test, the bonded pairs are cut into pieces with sizes of 20 mm×20 mm. Aluminum alloy holders are attached to both sides of the bonded pair using epoxy resin. Any other resin that does not fail under the test conditions may be used. The samples are tested on a mechanical strength tester. Tensile force is increased till one article breaks, and the value of maximum force is recorded. Bonding strength is the tensile force per sample surface area.

Depth of Layer (DoL) is the thickness of an ion-exchanged layer, a region where compressive stress exists. The ion concentration of K and Na is preferably tested by linear scanning by EDX (JEOL JSM-6380). The Li ion concentration is preferably not probed directly. DoL of Li ion is equal to the reduction of DoL of K/Na. Thus, DoL of Li ion can be deduced from the reduction of DoL of K/Na.

Average roughness ($R_a$) is a measure of the texture of a surface. It is quantified by the vertical deviations of a real surface from its ideal form. Common amplitude parameters characterize the surface based on the vertical deviations of the roughness profile from the mean line. $R_a$ is the arithmetic average of the absolute values of these vertical deviations.

The thickness of an article is the arithmetic average of the thickness of the article to be measured.

The following definitions apply with regard to the indicated terms as used in the present specification:

Upper crystallization temperature ($T_{OEG}$): The temperature when crystals start to appear upon cooling of the glass Working temperature ($T_4$): The temperature when glass viscosity is 104 dPas.

Transition temperature (Tg): the thermal expansion, heat capacity, shear modulus, and many other properties of inorganic glass show a relatively sudden change at the glass transition temperature. Any such step or kink can be used to define $T_g$.

Luminous transmittance $T_{D65}$: Transmittance under D65 light source (380-780 nm).

UV cutting edge: The wavelength at which UV transmittance is zero.

Optical basicity: The ability of providing an electron.

DETAILED DESCRIPTION OF THE DISCLOSURE

Article

Figure 1:
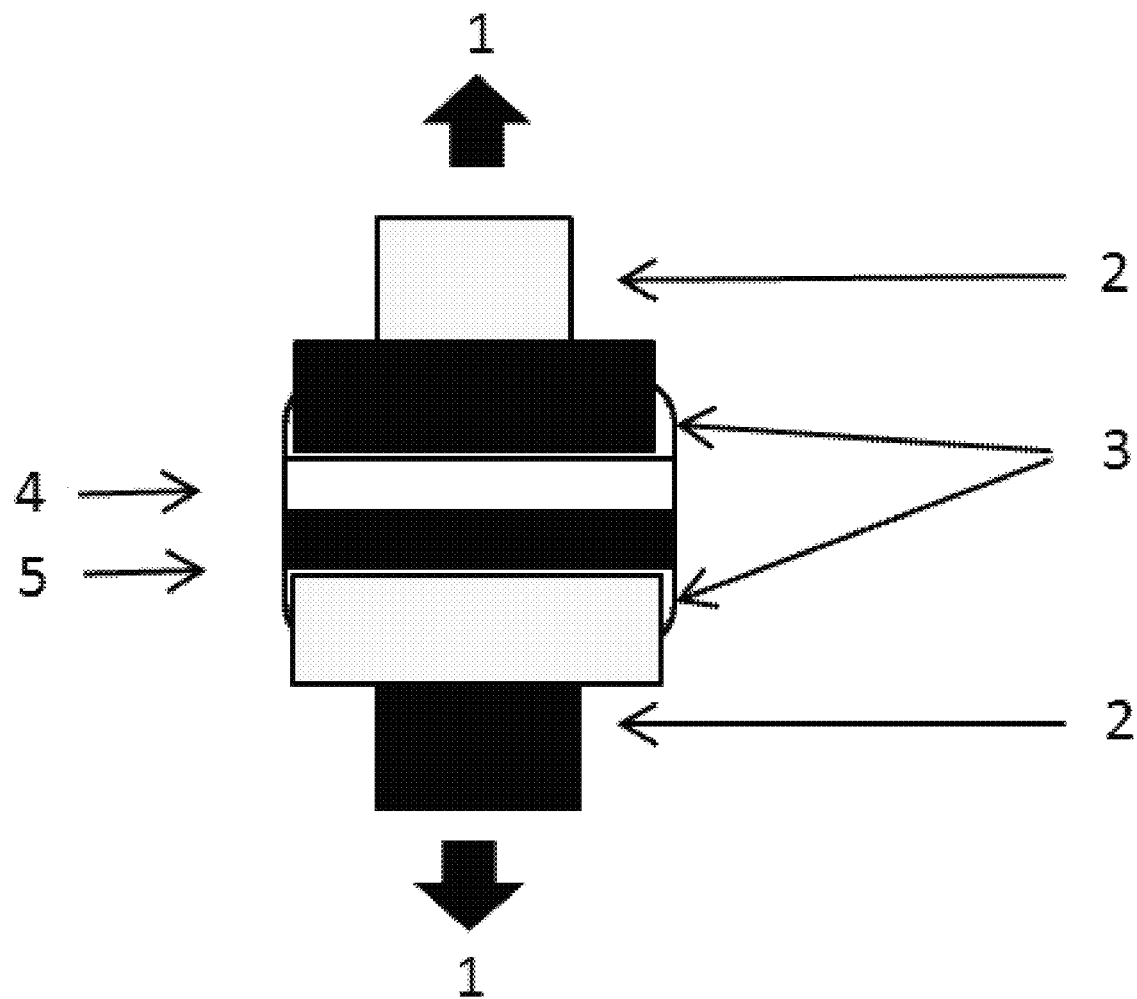
FIG. 1 shows the test set up for testing bonding strength.

The glass article can have a LABS of at least 1.5 MPa, at least 2 MPa, at least 5 MPa, at least 10 MPa, or at least 15 MPa. The higher the LABS, the higher is the articles susceptibility to the effects associated with lithium enrichment treatment. Bonding strength can be improved by increasing the DoL of the lithium enriched surface layer. A higher DoL can be achieved by increased ion-exchange time, higher process temperature during ion exchange and/or higher concentrations of lithium in the salt bath.

The glass article can have very small thickness. Thinner articles need very little space and add only minor weight to the final product. However, very thin articles may not be stable enough, and may easily break during use or during the bonding strength test. Thus, the glass article can have a thickness of up to 1.5 mm, up to 1 mm, up to 0.9 mm, up to 0.8 mm, up to 0.7 mm, up to 0.6 mm, up to 0.5 mm, up to 0.4 mm, up to 0.3 mm, up to 0.2 mm, up to 0.1 mm, up to 90 μm, up to 80 μm, up to 70 μm, up to 60 m, up to 50 μm, up to 40 μm, up to 30 μm, or up to 20 μm. The article can have a thickness of at least 1 μm, at least 2 μm, or at least 3 μm. Such small and very small thicknesses may be achieved using processes like down draw, or overflow fusion, or re-draw. These processes are superior to other processes like the float process or pressing in that these processes may yield very smooth and flat surfaces. Smooth and flat surfaces are desirable for bondable glasses because bonding strengths will be higher with very flat and smooth surfaces. Thus, the glass article preferably has an $R_a$ surface roughness of less than 2 nm, less than 1 nm, or less than 0.5 nm. It is desirable for the glass article to have at least one surface that has this low roughness, preferably the two major surfaces of the article have such roughness properties. These very smooth surfaces obtainable by the processes mentioned above are also called "fire-polished" surfaces. The glass article can have at least one, or at least two fire-polished surfaces, preferably the two major surfaces of the article have fire-polished properties.

The glass article of this disclosure can have a total thickness variation (TTV) of not more than 10 μm. A low TTV is desirable for good bondability of a glass article. Particularly, low TTV is achieved with processes like down draw, or overflow fusion, or re-draw, if the glass has the relevant viscosity characteristics. The glass used for the purposes of this disclosure has shown to exhibit the viscosity behavior, i.e. the susceptibility of the viscosity to temperature change is such that glass articles with excellent surface and flatness properties can be obtained in economical ways using these processes. The glass article can have a warp of not more than 50 μm. Much like a low TTV, low warp is desirable for good bondability of a glass article. Likewise, low warp may be achieved with processes like down draw, or overflow fusion, or re-draw, if the glass has the relevant viscosity characteristics, which is the case for the glass used for the glass article herein.

One of the aspects that makes the glass suitable for the above-mentioned flat glass processes is the difference between working temperature and upper crystallization temperature of the glass forming the glass article. The greater the difference between these temperatures is, the less susceptible is the glass to temperature changes during production, and the less is the risk of unintended devitrification during production. The glass of the glass article can have a working temperature $T_4$, and an upper crystallization temperature $T_{OEG}$, wherein the difference $T_4-T_{OEG}$ can be more than 50 K, more than 100 K, more than 150 K, more than 200 K, or more than 250 K. The glass of the glass article can have a working temperature $T_4$ of from 1000° C. to 1500° C., or from 1100° C. to 1400° C., or from 1200° C. to 1375° C., or from 1225° C. to 1350° C. The upper crystallization temperature $T_{OEG}$ can range from 900° C. to 1300° C., from 950° C. to 1250° C., from 1000° C. to 1200° C., or from 1050° C. to 1150° C.

The glass of the glass article can have a coefficient of thermal expansion (CTE, $\alpha_{20\text{-}300°\ C.}$), which closely resembles the CTE of silicon. It is beneficial for the glass to have a similar CTE as silicon in order to get a most reliable bond between glass and silicon articles. CTE of the glass can be from 1 to 10 ppm/K, less than 6.5 ppm/K, less than 6.0 ppm/K, less than 5.5 ppm/K, less than 5.0 ppm/K, less than 4.5 ppm/K, less than 4.0 ppm/K, or from 2.5 to 3.5 ppm/K. CTE is influenced by the glass composition, in particular by the amount of alkali metal oxides, but also by the process of production, in particular by the cooling rates applied during glass forming. Notably, a glass with a relatively low CTE is easier to be formed into a particularly flat glass article in terms of low TTV and low warp. Also, the glass article can have a transition temperature Tg of more than 470° C., or more than 490° C. A high transition temperature is particularly advantageous to usage in high temperature. Glass articles having such high transition temperature Tg usually also have an advantageously low CTE.

The article of this disclosure has excellent transmission properties, which can include a luminous transmittance $T_{D65}$ at 0.5 mm thickness of more than 91% and/or less than 91.7%, or less than 91.5%. High luminous transmittance $T_{D65}$ is advantageous, in particular a good signal can be obtained in various applications. For the article to have a desirable transmission it is desired that the UV cutting edge is as low as possible. The glass of the glass article can have a UV cutting edge at 1 mm thickness of lower than 300 nm, lower than 270 nm, or even lower than 250 nm.

The glass of the glass article can have a refractive index nd of less than 1.55, less than 1.50, less than 1.49, or less than 1.48.

Importantly, the glass of the glass article can have a very low autofluorescence intensity. Autofluorescence intensity is influenced by optical basicity. Low optical basicity leads to reduced fluorescence, which is good for biotechnology applications; Cy3 and Cy5 dyes are often used in the biotechnology field. These dyes fluoresce at 570 nm and 670 nm, where many glasses show auto-fluorescence. Auto-fluorescence leads to bad signal-to-noise ratio in optical signal detection processes. The glass of the glass article can have an autofluorescence emission/excitation intensity ratio at 488 nm of less than 1%. The glass of the glass article can have an optical basicity A less than 0.6, or less than 0.55, or less than 0.53, or less than 0.52, or less than 0.51.

In an embodiment, the glass of the glass article comprises the following proportions of oxides:

| | |
|---|---|
| SiO$_2$ | >60 to 90 mol % |
| Al$_2$O$_3$ | >0 to 15 mol % |
| B$_2$O$_3$ | >4 to 25 mol % |
| R$_2$O | >0 to <20 mol % |
| RO | 0 to <20 mol % | wherein R$_2$O is the sum of the amounts of the alkali metal oxides Li$_2$O, Na$_2$O and K$_2$O, and RO is the sum of the amounts of ZnO and the alkaline earth metal oxides MgO, CaO, SrO, and BaO.

In an embodiment, the glass of the glass article comprises the following proportions of oxides:

| | |
|---|---|
| SiO$_2$ | >60 to 90 mol % |
| Al$_2$O$_3$ | >0 to 15 mol % |
| B$_2$O$_3$ | >5 to 25 mol % |
| R$_2$O | >0 to <20 mol % |
| RO | 0 to <20 mol % | wherein R$_2$O is the sum of the amounts of the alkali metal oxides Li$_2$O, Na$_2$O and K$_2$O, and RO is the sum of the amounts of ZnO and the alkaline earth metal oxides MgO, CaO, SrO, and BaO.

The glass can comprise the following proportions of oxides:

| | |
|---|---|
| SiO$_2$ | >80 to <85 mol % |
| Al$_2$O$_3$ | >0.5 to <3 mol % |
| B$_2$O$_3$ | >8 to 15 mol % |
| R$_2$O | >0 to <5 mol % |
| RO | 0 to <5 mol % | wherein R$_2$O is the sum of the amounts of the alkali metal oxides Li$_2$O, Na$_2$O and K$_2$O, and RO is the sum of the amounts of ZnO and the alkaline earth metal oxides MgO, CaO, SrO, and BaO.

In an embodiment $$\frac{x_{B3+}}{x_{A13+}} \geq 7.5, \text{ or } \frac{x_{B3+}}{x_{A13+}} \geq 10.$$

In certain embodiments, the glass can be characterized by $$\frac{x_{B3+}}{x_{A13+}} \leq 25, \frac{x_{B3+}}{x_{A13+}} \leq 20, \text{ or } \frac{x_{B3+}}{x_{A13+}} \leq 15.$$

Certain components have a negative influence on UV transmittance. The proportions of such components are desirably limited in the glass. The glass of the glass article can comprise SnO$_2$, Sb$_2$O$_3$, Ce$_2$, TiO$_2$ and/or Fe$_2$O$_3$ in individual amounts of 0 to 0.5 mol %, or of less than 0.01 mol %.

The glass article can be a glass wafer or glass sheet, having a width, a length, and a thickness. The width and length are each independently at least 10 mm, and the thickness is not more than 1.5 mm.

After option lithium enrichment, the article can have on at least one surface a lithium-enriched surface layer. Lithium enrichment can be done on one or both of the major surfaces, on surfaces to be bonded, and/or on all surfaces of the article. In certain embodiments, the article can have a lithium proportion Li$_{surface}$ in at least one lithium enriched surface layer, and a bulk lithium proportion Li$_{bulk}$, wherein $$\frac{Li_{surface} \text{ [mol \%]}}{Li_{bulk} \text{ [mol \%]}} \geq 5.$$

For the purposes of the present disclosure, a "surface layer" is a proportion of the glass which is at the glass/air interface. The glass forming the surface will here be referred to as "surface layer"; the remaining glass located further in the interior will here be referred to as "bulk". A precise demarcation between surface and bulk is difficult; therefore, it is specified for the purposes of the present disclosure that the surface layer is present in a depth of about 6 nm. The properties of the surface layer are consequently determined at a depth of about 6 nm. The properties of the bulk glass are determined by calculation since the glass composition at a greater depth does not experience any change as a result of production. Bulk glass is in any case present at a depth of 500 nm. The surface can be advantageously influenced by particular measures during glass production. The properties of the surface layer are critical for particular properties of the glass which are measured on the surface. These include, in particular, the base resistance and the hydrolytic resistance. The composition of the surface glass at a depth of about 6 nm can be measured by means of Cs-TOF-SIMS at 1000 eV.

Lithium enrichment enriches one or more surfaces with Li$^+$. The lithium-enriched layer can have a depth of layer (DoL) of 0.01 to 200 µm, of 0.1 to 100 µm, of 0.5 to 50 µm, or of more than 1 µm. A higher DoL increases the effect of lithium enrichment so that higher bonding strengths and/or milder bonding conditions may be achieved. The Li$^+$ content in the lithium-enriched layer can be greater than 1 ppm (m/m), or greater than 10 ppm, or greater than 20 ppm, or greater than 30 ppm. The higher the lithium content the higher the effect of lithium enrichment so that higher bonding strengths and/or milder bonding conditions can be achieved.

The glass article can be bonded to one or more semiconductor articles, such as wafers. Bonding can have a bonding strength of at least 1 MPa, at least 2 MPa, at least 3 MPa, at least 4 MPa, at least 5 MPa, at least 8 MPa, at least 10 MPa, or at least 15 MPa. The semiconductor wafer can be a silicon wafer.

Method of Making

The present disclosure includes a method of making an article as set out herein. The method of making can include the steps of:
 providing a composition of glass raw materials in accordance with the desired glass composition,
 melting the composition,
 preparing the glass article.

The step of preparing the glass article can include forming the glass article in accordance with a flat glass process selected from the group consisting of down-draw (such as slot down-draw), overflow fusion, floating, rolling, pressing, and re-draw. From those processes mentioned down draw, overflow fusion and re-draw are the most preferred processes. These processes are desirable because they may yield glasses with excellent flatness (e.g. TTV, Warp) and surface properties (R$_a$, fire-polished). It is thus desired to use glasses that combine the properties of being bondable with high bonding strength in mild conditions, have low auto-fluorescence, excellent light transmission properties, and the viscosity-temperature behavior needed to process the glasses in the preferred flat glass processes mentioned before. The glass of the glass article above has these properties.

The method of making the glass article can include cooling the glass from a temperature $T_1$ that corresponds to a viscosity of $10^{10}$ dPas to a temperature $T_2$ that corresponds to a viscosity of $10^{15}$ dPas with an average cooling rate of >5 K/s and/or <200 K/s. Preferably, cooling takes place in air. Very fast cooling will lead to decreased flatness, such as TTV and warp. Cooling speed has an influence on CTE and on the susceptibility of the glass to ion exchange treatment such as lithium enrichment and chemical toughening. The cooling rate can be limited to less than 150 K/s, less than 100 K/s, or less than 50 K/s.

The method may optionally include a step of enriching at least one surface layer of the glass article with $Li^+$. As mentioned above, lithium enrichment may improve bonding ability of the glass article and may facilitate bonding at milder conditions. Lithium enrichment may be done by subjecting the glass article to a lithium-containing salt, or a lithium-containing mixture of salts, e.g. in a respective salt bath, at a temperature of at least 350° C. for more than 1 minute.

The amount of $Li^+$ in the salt or mixture of salts can be at least 1 ppm (m/m), at least 10 ppm, at least 50 ppm, at least 100 ppm, or at least 150 ppm. A higher amount of lithium will allow for shorter enrichment treatment times and/or deeper penetration of the glass article. However, at very high levels there may be no additional effect. In an embodiment the amount of $Li^+$ in the salt or mixture of salts is up to 1,000 ppm (m/m), up to 800 ppm, up to 600 ppm, up to 400 ppm, or up to 300 ppm.

The temperature at which lithium enrichment is done can be limited to 500° C., or less than 480° C., or less than 420° C. A lower temperature makes the process more economical because of reduced energy consumption in a given time, but it also slows down the process so that the temperature should not be too low either. The glass article can be subjected to the salt or mixture of salts for a time of at least 5 minutes, at least 10 minutes, at least 20 minutes, at least 30 minutes, at least 45 minutes, at least 60 minutes, or at least 90 minutes. A sufficient amount of time should be chosen in order to achieve a sufficient DoL of lithium in the article.

However, there is no additional benefit of increasing the time over a certain threshold. The glass article can be subjected to the salt or mixture of salts for a time of up to 5 hours, up to 4 hours, up to 3 hours, or up to 2 hours.

In an embodiment the step of subjecting the glass article to a lithium-containing salt, or a lithium-containing mixture of salts can include:
immersing the glass article in a salt bath.

The lithium-containing salt, or a lithium-containing mixture of salts can include $LiNO_3$. The mixture of salts can include $LiNO_3$, and optionally at least one of $NaNO_3$, $KNO_3$, $CsNO_3$ and $AgNO_3$ Before or after enriching at least one surface layer of the glass article with $Li^+$, the glass article can be chemically toughened. The chemical toughening can also be performed on a glass article of this disclosure that has not been subjected to lithium enrichment. The glass article can be chemically toughened using a $K^+$ containing salt. The other steps of chemical toughening can be the same as in the lithium enrichment treatment with the difference that the surface will be enriched with potassium during chemical toughening.

The method can include a step of bonding the glass article to another article, including articles of glass or semiconductors. The other article can be a semiconductor wafer, such as a silicon wafer. Bonding can include anodic bonding and/or thermal bonding. Anodic bonding can comprise the following steps:
cleaning the glass article,
cleaning the other article,
anodically bonding the two cleaned articles.
Additionally, or alternatively, bonding can include
cleaning the glass article,
enriching at least one surface layer of the glass article with $Li^+$,
cleaning the glass article after enriching,
cleaning the other article,
anodically bonding the two cleaned articles.

Bonding can include anodic bonding with a bonding voltage of less than 1000 V, less than 800 V, less than 600 V, or less than 400 V. A lower bonding voltage is advantageous as it reduces the risk of damaging the articles to be bonded or any circuitry present on these articles. The same is true for bonding temperature. Bonding temperature can be less than 450° C., less than 300° C., or less than 200° C. Bonding results may be improved by pressing together the articles to be bonded. The pressure with which the articles are pressed together can be from 0.1 to 1 MPa, or 0.15 to 0.5 MPa. In order to avoid presence of any gases between the bonded articles, bonding takes place at reduced pressure, such as at a pressure of $10^{-4}$ to $10^{-2}$ Pa.

Bonding can include thermal bonding at a temperature of less than 900° C., less than 800° C., less than 750° C., or less than 700° C.

The glass article of the present disclosure can be processed by laser cutting. For example, a laser may be used for cutting the article into a desired shape. Furthermore, a laser may also be used for drilling fine structures, for example holes, into the glass article. In particular, holes having a diameter of 500 to 800 μm can be drilled by a laser into glass articles having a thickness of 50 to 100 μm. Glass articles provided with such fine structures can preferably be used in microfluidics, biotech, MEMS or comparable applications.

The glass article can also be processed by acid treatment. However, the selectivity of acid treatment is lower, and the precision may be difficult to control. Therefore, processing the glass article with a laser is more preferred.

Use of Glass Article

The present disclosure also relates to a use of the article in the fields of biotechnology, MEMS, CIS, MEMS-like pressure sensor, display, micro array, electronic devices, microfluidics, semiconductor, high precision equipment, camera imaging, display technologies, sensor/semicon, electronic devices, home appliance, diagnostic product, and/or medical device.

High UV transmittance, low UV cutting edge of the articles is particularly advantageous for use in the fields of MEMS, CIS, MEMS-like pressure sensor, display, micro array, electronic devices, microfluidics, semiconductor, high precision equipment, camera imaging, display technologies, sensor/semicon, electronic devices, home appliance.

Low autofluorescence of the articles is particularly advantageous for use in the fields of biotechnology, diagnostic product, and/or medical device.

EXAMPLES

Example 1—Glass Melting

Glass melts were prepared in accordance with the compositions given in the following tables 1a and 1b. Glass raw materials were melted and formed into thin glass sheets of 0.7 mm thickness using the down draw production method. The glass sheets were cut to wafers.

TABLE 1a

| mol % | A | B | C | D | E | F | G | H | I | J | K |
|---|---|---|---|---|---|---|---|---|---|---|---|
| SiO₂ | 82 | 80 | 84.2 | 79 | 72 | 70 | 72.5 | 75 | 75 | 79.4 | 66.1 |
| Al₂O₃ | 1.6 | 4 | 0.8 | 2.5 | 5 | 4 | 0.4 | 1 | 0.5 | 2.6 | 6.5 |
| B₂O₃ | 12 | 11 | 10 | 12 | 12 | 11 | 19.7 | 20 | 18.5 | 9.6 | 8 |
| Li₂O | | | | 1 | 5 | 10 | | | | | |
| Na₂O | 4 | 3 | 4.8 | 5 | 5.7 | 2.5 | 3.9 | 2 | 3 | 4.6 | 5 |
| K₂O | 0.4 | 2 | 0.2 | 0.5 | 0.3 | 1.8 | 2.5 | 2 | 2 | 0.6 | 0.5 |
| MgO | | | | | | | | | | | 6.9 |
| CaO | | | | | | | | | 1 | 1.6 | 3.3 |
| BaO | | | | | | | | | | | |
| SrO | | | | | | | | | | | 1.9 |
| Sb₂O₃ | | | | | | | 0.2 | | | | |
| F | | | | | | 0.7 | 0.7 | | | | |
| ZnO | | | | | | | | | | | |
| NaCl | | | | | | | 0.1 | | | 1.6 | 1.6 |
| TiO₂ | | | | | | | | | | | |
| R₂O | 4.4 | 5 | 5 | 6.5 | 11 | 14.3 | 6.4 | 4 | 5 | 5.1 | 5.5 |
| RO | 0 | 0 | 0 | 0 | 0 | 0 | 0 | 0 | 1 | 1.6 | 12.2 |
| Density (g/cm³) | 2.2 | 2.2 | 2.3 | 2.2 | 2.3 | 2.3 | 2.2 | 2.2 | 2.2 | 2.3 | 2.4 |
| CTE (ppm/K) | 3.3 | 3.4 | 3.2 | 3.5 | 3.9 | 4.7 | 4.2 | 3.7 | 3.8 | 4.4 | 5.8 |
| Tg(° C.) | 524 | 520 | 535 | 618 | 610 | 558 | 552 | 560 | 566 | 588 | 619 |
| T₄ (° C.) | 1302 | 1409 | 1225 | 1282 | 1230 | 1028 | 1036 | 1145 | 1101 | 1309 | 1273 |
| T_OEG(° C.) | 1137 | 1243 | 1077 | 1116 | 1078 | 914 | 918 | 1013 | 973 | 1140 | 1138 |
| Littleton point(° C.) | 873 | 942 | 846 | 858 | 836 | 733 | 731 | 783 | 766 | 875 | 906 |
| Young's modulus (GPa) | 64 | 63 | 69 | 64 | 64 | 65 | 62 | 57 | 62 | 65 | 74 |
| Optical basicity Λ | 0.52 | 0.52 | 0.52 | 0.52 | 0.54 | 0.55 | 0.51 | 0.51 | 0.51 | 0.53 | 0.55 |
| Auto fluorescence at 570 nm | no | no | no | no | no | no | no | no | no | no | |
| Auto fluorescence at 670 nm | no | no | no | no | no | no | no | no | no | no | |

The glasses melted had excellent CTE and desirable Tg. Processability in the down draw process was excellent.

TABLE 1b

| mol % | L | M | N | O | P | Q | R | S | T | U |
|---|---|---|---|---|---|---|---|---|---|---|
| SiO₂ | 67.2 | 67.2 | 67.2 | 67.2 | 67.2 | 67.2 | 67.2 | 67.2 | 67.2 | 64.2 |
| Al₂O₃ | 11.3 | 11.3 | 11.3 | 11.3 | 11.3 | 11.3 | 11.3 | 11.3 | 11.3 | 4.2 |
| B₂O₃ | 9.9 | 9.9 | 9.9 | 16 | 14 | 9.9 | 7 | 5 | 9.9 | 8.5 |
| Li₂O | | | | | | | | | | |
| Na₂O | | | | | | | | | | 6.4 |
| K₂O | | | | | | | | | | 6.9 |
| MgO | 4.6 | 4.6 | 11.5 | 6 | 9 | 11.5 | 14 | 17 | 4.6 | |
| CaO | 5.5 | 6.9 | | | | | | | 5.5 | |
| BaO | 1.4 | | | | | | | | | |
| SrO | | | | | | | | | | |
| Sb₂O₃ | 0.5 | 0.5 | 0.5 | | | | | | | |
| F | | | | | | | | | | |
| ZnO | | | | | | | | | | 5.9 |
| NaCl | | | | | | | | | 1.4 | |
| TiO₂ | | | | | | | | | | 3.9 |
| R₂O | 0 | 0 | 0 | 0 | 0 | 0 | 0 | 0 | 0 | 13.3 |
| RO | 10.1 | 11.5 | 11.5 | 6 | 9 | 11.5 | 14 | 17 | 10.1 | 0 |
| Optical basicity Λ | 0.54 | 0.54 | 0.53 | 0.51 | 0.52 | 0.53 | 0.53 | 0.54 | 0.53 | 0.58 |
| Auto fluorescence at 570 nm | no | no | no | no | no | no | no | no | no | |
| Auto fluorescence at 670 nm | no | no | no | no | no | no | no | no | no | |

Example 2—Lithium Activation

The glass wafers produced according to example 1 were subjected to a lithium-containing mixture of salts (LiNO₃/NaNO₃) with different lithium proportions ranging from 50 ppm to 400 ppm. Different process times for the ion exchange (ionx) were applied in order to achieve various depths of ion exchanged layers.

The conditions and results are summarized in table 2 below.

Example 3—Bonding Strength Test

After activation by lithium ion exchange treatment, bonding tests were performed in order to test the influence of activation on bonding strengths and conditions. The glass wafers of the previous examples were bonded to silicon wafers.

Anodic bonding was done at different bonding temperatures and voltages. The bonding pressure was 0.2 MPa for all samples. The vacuum was set to 0.001 Pa for all experiments.

Figure 2:
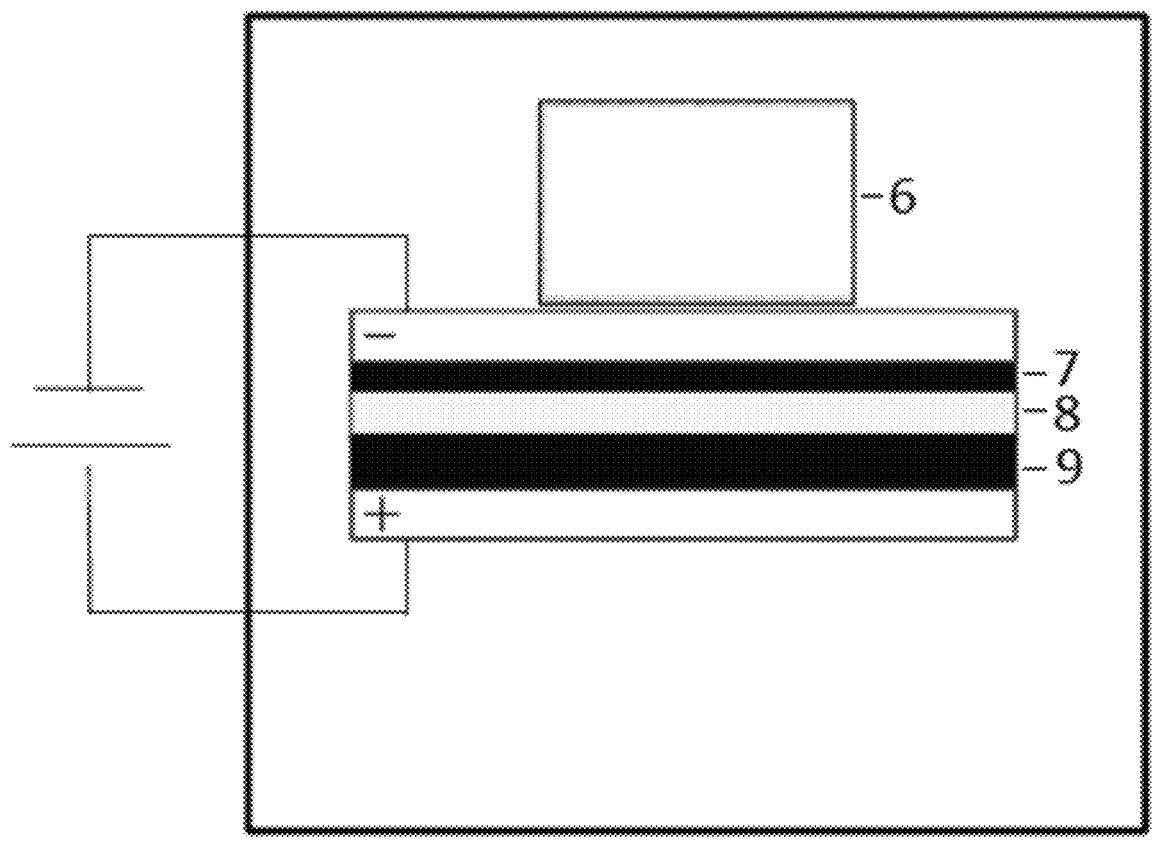
FIG. 2 is a general illustration of anodic bonding

The bonding set up is shown in FIG. 2.

For the bonding strength test the bonded pairs were cut into pieces with sizes of 20 mm×20 mm. Aluminum alloy holders were attached to both sides of the bonded pair using epoxy resin. The epoxy resin was solidified, and samples tested on a mechanical strength tester. Tensile force was increased till the glass wafers broke, and the value of maximum force was recorded. Bonding strength is the tensile force per sample surface area. The bonding strength test setup can be seen in FIG. 1.

The results are shown in the following table 2.

TABLE 2

| Example No. | 1 | 2 | 3 | 4 | 5 | 6 | 7 | 8 |
| --- | --- | --- | --- | --- | --- | --- | --- | --- |
| Melt No. | A | C | A | B | A | C | A | B |
| Lithium [ppm] | 50 | 50 | / | 200 | 200 | 400 | 400 | 400 |
| ionx T [° C.] | 350 | 400 | / | 300 | 350 | 300 | 350 | 400 |
| ionx t [min] | 60 | 10 | / | 60 | 120 | 10 | 60 | 120 |
| DoL [μm] | 5 | 3 | / | 7 | 10 | 6 | 12 | 33 |
| Bonding temperature [° C.] | 300 | 300 | 250 | 250 | 250 | 200 | 200 | 200 |
| Bonding voltage [V] | 400 | 400 | 360 | 360 | 360 | 300 | 300 | 300 |
| Bonding strength [MPa] | 10.03 | 9.81 | 1.98 | 10.52 | 13.66 | 10.89 | 15.37 | 18.23 |

It can be seen from these tests that the DoL has a remarkable influence on bonding strength. Even very small DoL have a strong effect on bonding strength.

LIST OF REFERENCE SIGNS

1 Tensile force
2 Aluminum alloy holder
3 Epoxy resin
4 Glass wafer
Si wafer
6 Additional pressing force
7 Graphite paper
8 Glass
9 Silicon

The invention claimed is:

1. A glass article with Li⁺-activatable bonding properties, comprising:
   a UV-transmittance of more than 90% at 350 nm and at 500 nm;
   a lithium activatable bonding strength to silicon (LABS) of at least 1.1 MPa;
   a total amount of $SiO_2$, $B_2O_3$ and $Al_2O_3$ of at least 75 mol %;
   a proportion of $Li_2O$ that is less than 0.01 mol %;
   a molar proportion $x_{Si4+}$ of $Si^{4+}$,
   a molar proportion $x_{B3+}$ of $B^{3+}$; and
   a molar proportion $x_{Al3+}$ of $Al^{3+}$,
   wherein the molar proportions $x_{Si4+}$, $x_{B3+}$, and $x_{Al3+}$ are present in accordance with the following ratios:

i. $\frac{x_{Si4+}}{x_{B3+} + x_{Al3+}} \geq 2.0$, and $\frac{x_{Si4+}}{x_{B3+} + x_{Al3+}} \leq 8.0$; and ii. $\frac{x_{B3+}}{x_{Al3+}} \geq 0.5$.

2. The glass article according to claim 1, wherein the total amount of $SiO_2$, $B_2O_3$ and $Al_2O_3$ is at least 90 mol %, and wherein the molar proportion $x_{Si4+}$ of $Si^{4+}$, the molar proportion $x_{B3+}$ of $B^{3+}$ and the molar proportion $x_{Al3+}$ of $Al^{3+}$ are present in accordance with the following ratios:

i. $\frac{x_{Si4+}}{x_{B3+} + x_{Al3+}} \geq 3.0$, and $\frac{x_{Si4+}}{x_{B3+} + x_{Al3+}} \leq 8.0$; and ii. $\frac{x_{B3+}}{x_{Al3+}} \geq 1.5$.

3. The glass article according to claim 1, having an $R_a$ surface roughness of less than 2 nm.

4. The glass article according to claim 1, having at least one fire-polished surface.

5. The glass article according to claim 1, having a total thickness variation of not more than 10 μm.

6. The glass article according to claim 1, having a Warp of not more than 50 μm.

7. The glass article according to claim 1, having a coefficient of thermal expansion (CTE, 20 to 300° C.) of from 1 to 10 ppm/K.

8. The glass article according to claim 1, wherein the glass of the glass article has a working temperature $T_4$, and an upper crystallization temperature $T_{OEG}$, wherein the difference $T_4 - T_{OEG}$ is more than 50 K, wherein working temperature $T_4$ is from 1000° C. to 1500° C., and the upper crystallization temperature $T_{OEG}$ is from 900° C. to 1300° C.

9. The glass article according to claim 1, wherein the glass of the glass article has a luminous transmittance $T_{D65}$ at 0.5 mm thickness of more than 91% and/or less than 91.7%.

10. The glass article according to claim 1, wherein the glass of the glass article has a UV cutting edge at 1 mm thickness of lower than 300 nm.

11. The glass article according to claim 1, wherein the glass of the glass article has an autofluorescence emission/excitation intensity ratio at 488 nm of less than 1%.

12. The glass article according to claim 1, wherein the glass article is a glass wafer or glass sheet, having a width, a length, and a thickness, wherein width and length are each independently at least 10 mm, and the thickness is not more than 1.5 mm.

13. The glass article according to claim 1, further comprising, after lithium enrichment, at least one surface that is a lithium-enriched surface layer, the glass article having a lithium proportion $Li_{surface}$ in the at least one lithium enriched surface layer, and a bulk lithium proportion $Li_{bulk}$, wherein $$\frac{Li_{surface} \text{ [mol \%]}}{Li_{bulk} \text{ [mol \%]}} \geq 5,$$

wherein the lithium-enriched layer has a depth of layer (DoL) of 0.01 to 200 μm.

14. The glass article according to claim 1, wherein the glass article is bonded to a semiconductor wafer with a bonding strength of at least 1 MPa.

\* \* \* \* \*